United States Patent [19]
Johnson

[11] 3,745,566
[45] July 10, 1973

[54] OPTICAL RADIATION DETECTOR
[75] Inventor: Peter D. Johnson, Schenectady, N.Y.
[73] Assignee: The United States of America as represented by the Secretary of the Navy, Washington, D.C.
[22] Filed: June 14, 1962
[21] Appl. No.: 202,635

[52] U.S. Cl. .......... 343/5 R, 250/83.3 UV, 340/4 R
[51] Int. Cl. .............................................. G01s 9/00
[58] Field of Search ............. 250/71, 71.5, 83.3 UV, 250/83.3 H, 71.5 R, 71 G; 343/5, 5 R, 6 ND; 340/4 R

[56] References Cited
UNITED STATES PATENTS
2,587,976   3/1952   DeMent ................................ 250/71
2,972,924   2/1961   Clemens ................................. 356/4
3,043,908   7/1962   Madsen .................................. 250/71
3,078,453   2/1963   McGillem et al. ...................... 343/5

Primary Examiner—Carl D. Quarforth
Assistant Examiner—J. M. Potenza
Attorney—Raymond I. Tompkins, Louis B. Applebaum and Philip Schneider

[57] ABSTRACT

The system comprises two propagators and receivers for the detection of submarine wakes. The propagators irradiate oil films in submarine wakes thereby causing the oil to fluoresce. The fluorescent emanations from adjacent areas of the oil and detected by the receivers which provide an appropriate indication.

18 Claims, 1 Drawing Figure

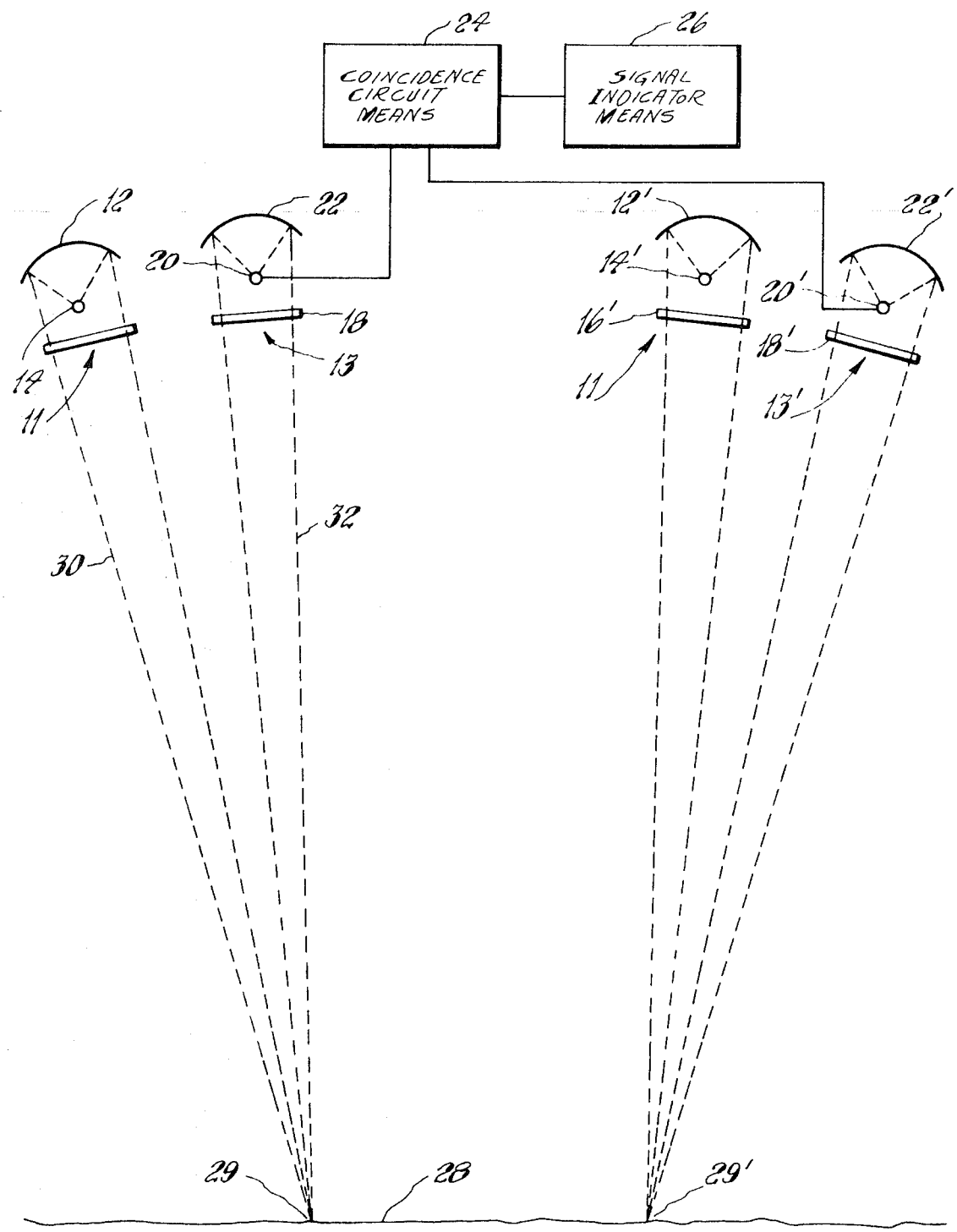

OPTICAL RADIATION DETECTOR

This invention relates to detection apparatus and especially to a system for the detection of submarine wakes by means of radiation.

It has been found that an oil film appears in the wake of a submarine, presumably as a consequence of the destruction of tiny marine animal life. This oil film can be made to fluoresce by exposure to ultraviolet radiation.

The objects and advantages of the present invention are accomplished by irradiating oil films in submarine wakes with radiation such as ultraviolet light which causes the oil to fluoresce. Fluorescent emanations from adjacent areas of the oil are received by a pair of receivers sensitive to such radiation, the receivers being focused on adjacent areas of the oil film. The output of these receivers is fed to an indicating instrument through a coincidence circuit so that the meter provides an indication only when both receivers are receiving fluorescent emanations.

An object of the invention is to detect fluorescent radiation.

Another object is to detect oil residues.

A further object is to detect submarines by means of the oil films left in submarine wakes by marine organisms.

Other objects and many of the attendant advantages of this invention will be readily appreciated as the same becomes better understood by reference to the following detailed description when considered in connection with the accompanying drawings wherein:

The FIGURE is a schematic representation of an embodiment of the invention.

The components of the invention comprise a pair of ultraviolet-radiation propagators 11 and 11' and a pair of fluorescent-radiation receivers 13 and 13', coincidence circuit means 24 and means for indicating an output signal 26. The propagators and receivers are preferably located along the wings of an airplane and the rest of the radiation detector is located inside the airplane.

The propagators and receivers comprise two identical sets, each set consisting of one propagator and one receiver. Examining the first set, propagator 11 and receiver 13, it can be seen that the ultraviolet radiation propagator 11 comprises a large parabolic mirror 12, a source of ultraviolet radiation 14 located at the focal point of the mirror 12, and a filter 16 which transmits ultraviolet light and absorbs other frequencies of light. If the airplane is to be used at a height of about 1,000 feet, a parabolic mirror with a diameter of three feet irradiates a spot 29 on the ocean surface 28 slightly over three feet in diameter. The ultraviolet source 14 may, for example, be a high-pressure mercury (BH4) lamp. The ultraviolet-transmission filter 16 can be made of Corning 9863 glass, for example.

The fluorescent-radiation receiver 13 comprises a filter 18 for absorbing ultraviolet light, a parabolic mirror 22 and a photomultiplier tube 20 located at the focal point of the mirror 22.

The propagator 11 and the receiver 13 are both oriented to focus on the same spot 29 on the ocean surface 28. Since reflected and scattered radiation from the propagator should be excluded from the receiver, an ultraviolet-absorption filter 18 is employed and the plane containing the propagated and received beams of radiation is not perpendicular to the surface of the ocean.

The coincidence circuit means 24 comprises any suitable coincidence circuit and an amplifying circuit. The signal indicator means 26 may be any suitable meter, for example.

The photomultiplier outputs are fed into the coincidence circuit means 24 which provides an output only when the output of both photomultipliers is above a predetermined level (an increase in detected fluorescent radiation above the normal level). The coincidence circuit minimizes noise due to thermal radiation or reflected night radiation from the ocean surface.

Although it is not apparent in the FIGURE because of limitations of space, the spot 29' upon which the beam of the second propagator 11' is focused is adjacent to the spot 29 upon which the beam of the first propagator 11 is focused. This minimizes the possibility of non-detection of a submarine wake because the airplane is traveling parallel to the wake.

Although the system has been described as a system for the detection of fluorescent radiation, it can also be used to detect small changes in the reflectivity of oil-covered water. Reflectivity changes during the daytime can be detected by employing ultraviolet light of short wavelength (2,800 angstrom units) and suitable filters at the receivers. The short-wavelength ultraviolet light has the advantage that it is strongly absorbed by almost all organic materials so that the presence of an oil film leads to a significant change in reflectivity. However, if the system is used in this manner, the plane containing the propagated and reflected waves should be perpendicular to the surface of the ocean and the filters at the receivers should be filters which transmit ultraviolet light rather than filters which absorb it.

Obviously many modifications and variations of the present invention are possible in the light of the above teachings. It is therefore to be understood that within the scope of the appended claims the invention may be practiced otherwise than as specifically described.

I claim:

1. A radiation detector comprising, in combination:
    a pair of radiation propagators, each oriented to irradiate a different spot on a surface;
    a pair of radiation receivers, each oriented to receive radiation from a different one of said irradiated spots, and each providing an electrical output signal when radiation is received,
    said propagators and receivers being spaced from said surface, and
    the plane containing the propagated and received beams being non-perpendicular to said irradiated surface;
    coincidence circuit means to which the output signals from said receivers are applied as input signals, an output signal being provided by said coincidence circuit means whenever both input signals are applied simultaneously; and
    signal-indicating means connected to the output of said coincidence circuit means.

2. A radiation detector comprising, in combination:
    a pair of focusable radiation propagators, each oriented to irradiate a different spot on a surface;
    a pair of focusable radiation receivers, each oriented to receive radiation from a different one of said irradiated spots, and each providing an electrical output signal when radiation is received,
    said propagators and receivers being spaced from said surface, and the plane containing the propagated and received beams being non-perpendicular to said irradiated surface;

coincidence circuit means to which the output signals from said receivers are applied as input signals, an output signal being provided by said coincidence circuit means whenever both input signals are applied simultaneously; and signal-indicating means connected to the output of said coincidence circuit means.

3. A radiation detector comprising, in combination:

a pair of focusable radiation propagators, each oriented to irradiate a different spot on a surface;

a pair of focusable radiation receivers, each oriented to receive radiation from a different one of said irradiated spots, and each providing an electrical output signal when radiation is received, said irradiated spots being adjacent to each other on said surface, said propagators and receivers being spaced from said surface, and the plane containing the propagated and received beams being non-perpendicular to said irradiated surface;

coincidence circuit means to which the output signals from said receivers are applied as input signals, an output signal being provided by said coincidence circuit means whenever both input signals are applied simultaneously; and signal-indicating means connected to the output of said coincidence circuit means.

4. A radiation detector comprising, in combination:

a pair of radiation propagators, each oriented to irradiate a different spot on a surface;

a pair of radiation receivers which are sensitive to a different spectral band of radiation than that projected by said propagators, each receiver oriented to receive radiation from a different one of said irradiated spots, and each providing an electrical output signal when radiation is received, said propagators and receivers being spaced from said surface, and the plane containing the propagated and received beams being non-perpendicular to said irradiated surface;

coincidence circuit means to which the output signals from said receivers are applied as input signals, an output signal being provided by said coincidence circuit means whenever both input signals are applied simultaneously; and signal-indicating means connected to the output of said coincidence circuit means.

5. A radiation detector comprising, in combination:

a pair of focusable radiation propagators, each oriented to irradiate a different spot on a surface;

a pair of focusable radiation receivers which are sensitive to a different spectral band of radiation than that projected by said propagators, each receiver oriented to receive radiation from a different one of said irradiated spots, and each providing an electrical output signal when radiation is received, said propagators and receivers being spaced from said surface, and the plane containing the propagated and received beams being non-perpendicular to said irradiated surface;

coincidence circuit means to which the output signals from said receivers are applied as input signals, an output signal being provided by said coincidence circuit means whenever both input signals are applied simultaneously; and signal-indicating means connected to the output of said coincidence circuit means.

6. A radiation detector comprising, in combination:

a pair of focusable radiation propagators, each oriented to irradiate a different spot on a surface;

a pair of focusable radiation receivers which are sensitive to a different spectral band of radiation than that projected by said propagators, each receiver oriented to receive radiation from a different one of said irradiated spots, and each providing an electrical output signal when radiation is received, said irradiated spots being adjacent to each other on said surface, said propagators and receivers being spaced from said surface, and the plane containing the propagated and received beams being non-perpendicular to said irradiated surface;

coincidence circuit means to which the output signals from said receivers are applied as input signals, an output signal being provided by said coincidence circuit means whenever both input signals are applied simultaneously; and signal-indicating means connected to the output of said coincidence circuit means.

7. A radiation detector comprising, in combination:

a pair of ultraviolet-radiation propagators, each oriented to irradiate a different spot on a surface;

a pair of fluorescent-radiation receivers, each oriented to receive radiation from a different one of said irradiated spots, and each providing an electrical output signal when radiation is received, said propagators and receivers being spaced from said surface, and the plane containing the propagated and received beams being non-perpendicular to said irradiated surface;

coincidence circuit means to which the output signals from said receivers are applied as input signals, an output signal being provided by said coincidence circuit means whenever both input signals are applied simultaneously; and signal-indicating means connected to the output of said coincidence circuit means.

8. A radiation detector comprising, in combination:

a pair of focusable ultraviolet radiation propagators, each oriented to irradiate a different spot on a surface;

a pair of focusable fluorescent radiation receivers, each oriented to receive radiation from a different one of said irradiated spots, and each providing an electrical output signal when radiation is received, said propagators and receivers being spaced from said surface, and the plane containing the propagated and received beams being non-perpendicular to said irradiated surface;

coincidence circuit means to which the output signals from said receivers are applied as input signals, an output signal being provided by said coincidence circuit means whenever both input signals are applied simultaneously; and signal-indicating means connected to the output of said coincidence circuit means.

9. A radiation detector comprising, in combination:
a pair of focusable ultraviolet radiation propagators, each oriented to irradiate a different spot on a surface;
a pair of focusable fluorescent radiation receivers, each oriented to receive radiation from a different one of said irradiated spots, and each providing an electrical output signal when radiation is received,
said irradiated spots being adjacent to each other on said surface,
said propagators and receivers being spaced from said surface, and
the plane containing the propagated and received beams being non-perpendicular to said irradiated surface;
coincidence circuit means to which the output signals from said receivers are applied as input signals, and output signal being provided by said coincidence circuit means whenever both input signals are applied simultaneously; and
signal-indicating means connected to the output of said coincidence circuit means.

10. A radiation detector for the detection of submarine wakes comprising, in combination:
a pair of radiation propagators, each oriented to irradiate a different spot on a surface,
each said propagator comprising a focusing mirror, a source of ultraviolet radiation located at the focal point of said mirror, and an ultraviolet-transmission filter located in the path of the beam projected by said mirror;
a pair of radiation receivers, each oriented to receive radiation from a different one of said irradiated spots, and each providing an electrical output signal when radiation is received,
said propagators and receivers being spaced from said surface, and the plane containing the propagated and received beams being non-perpendicular to said irradiated surface,
each said radiation receiver comprising a focusing mirror, radiation-sensitive means located at the focal point of said mirror producing an electrical signal in response to irradiation, and a radiation filter located in the path of the radiation beam received by said mirror, said radiation filter passing a different spectral band of radiation than that emanating from said radiation propagators;
coincidence circuit means to which the output signals from said receivers are applied as input signals, an output signal being provided by said coincidence circuit means whenever both input signals are applied simultaneously; and
signal-indicating means connected to the output of said coincidence circuit means.

11. A radiation detector for the detection of submarine wakes comprising, in combination:
a pair of radiation propagators, each oriented to irradiate a different spot on a surface, said spots being adjacent to each other,
each said propagator comprising a focusing mirror, a source of ultraviolet radiation located at the focal point of said mirror, and an ultraviolet-transmission filter located in the path of the beam projected by said mirror;
a pair of radiation receivers, each oriented to receive radiation from a different one of said irradiated spots, and each providing an electrical output signal when radiation is received,
said propagators and receivers being spaced from said surface, and the plane containing the propagated and received beams being non-perpendicular to said irradiated surface,
each said radiation receiver comprising a focusing mirror, radiation sensitive means located at the focal point of said mirror producing an electrical signal in response to irradiation, and a radiation filter located in the path of the radiation beam received by said mirror, said radiation filter passing a different spectral band of radiation than that emanating from said radiation propagators;
coincidence circuit means to which the output signals from said receivers are applied as input signals, an output signal being provided by said coincidence circuit means whenever both input signals are applied simultaneously; and
signal-indicating means connected to the output of said coincidence circuit means.

12. A radiation detector for the detection of submarine wakes comprising, in combination:
a pair of radiation propagators, each oriented to irradiate a different spot on a surface,
each said propagator comprising a focusing mirror, a source of ultraviolet radiation located at the focal point of said mirror, and an ultraviolet-transmission filter located in the path of the beam projected by said mirror;
a pair of radiation receivers, each oriented to receive radiation from a different one of said irradiated spots, and each providing an electrical output signal when radiation is received,
said propagators and receivers being spaced from said surface, and the plane containing the propagated and received beams being non-perpendicular to said irradiated surface,
each said radiation receiver comprising a focusing mirror, photomultiplier means located at the focal point of said mirror producing an electrical signal in response to irradiation, and a radiation filter located in the path of the radiation beam received by said mirror, said radiation filer passing a different spectral band of radiation than that emanating from said radiation propagators;
coincidence circuit means to which the output signals from said receivers are applied as input signals, an output signal being provided by said coincidence circuit means whenever both input signals are applied simultaneously; and
signal-indicating means connected to the output of said coincidence circuit means.

13. A radiation detector comprising in combination:
a pair of radiation propagators, each oriented to irradiate a different spot on a surface;
a pair of radiation receivers which are sensitive to a different spectral band of radiation than that projected by said propagators, each receiver oriented to receive radiation from a different one of said irradiated spots, and each providing an electrical output signal when radiation is received,
said propagators and receivers being spaced from said surface;

coincidence circuit means to which the output signals from said receivers are applied as input signals, an output signal being provided by said coincidence circuit means whenever both input signals are applied simultaneously; and signal-indicating means connected to the output of said coincidence circit means.

14. A radiation detector comprising, in combination:

a pair of focusable radiation propagators, each oriented to irradiate a different spot on a surface;

a pair of focusable radiation receivers which are sensitive to a different spectral band of radiation than that projected by said propagators, each receiver oriented to receive radiation from a different one of said irradiated spots, and each providing an electrical output signal when radiation is received, said propagators and receivers being spaced from said surface;

coincidence circuit means to which the output signals from said receivers are applied as input signals, an output signal being provided by said coincidence circuit means whenever both input signals are applied simultaneously; and signal-indicating means connected to the output of said coincidence circuit means.

15. A radiation detector comprising, in combination:

a pair of focusable radiation propagators, each oriented to irradiate a different spot on a surface;

a pair of focusable radiation receivers which are sensitive to a different spectral band of radiation than that projected by said propagators, each receiver oriented to receive radiation from a different one of said irradiated spots, and each providing an electrical output signal when radiation is received, said irradiated spots being adjacent to each other on said surface, said propagators and receivers being spaced from said surface;

coincidence circuit means to which the output signals from said receivers are applied as input signals, an output signal being provided by said coincidence circuit means whenever both input signals are applied simultaneously; and signal-indicating means connected to the output of said coincidence circuit means.

16. A radiation detector comprising, in combination:

a pair of ultraviolet-radiation propagators, each oriented to irradiate a different spot on a surface;

a pair of fluorescent-radiation receivers, each oriented to receive radiation from a different one of said irradiated spots, and each providing an electrical output signal when radiation is received, said propagators and receivers being spaced from said surface;

coincidence circuit means to which the output signals from said receivers are applied as input signals, an output signal being provided by said coincidence circuit means whenever both input signals are applied simultaneously; and signal-indicating means connected to the output of said coincidence circuit means.

17. A radiation detector comprising, in combination:

a pair of focusable ultraviolet radiation propagators, each oriented to irradiate a different spot on a surface;

a pair of focusable fluorescent radiation receivers, each oriented to receive radiation from a different one of said irradiated spots, and each providing an electrical output signal when radiation is received, said propagators and receivers being spaced from said surface;

coincidence circuit means to which the output signals from said receivers are applied as input signals, an output signal being provided by said coincidence circuit means whenever both input signals are applied simultaneously; and signal-indicating means connected to the output of said coincidence circuit means.

18. A radiation detector comprising, in combination:

a pair of focusable ultraviolet radiation propagators, each oriented to irradiate a different spot on a surface;

a pair of focusable fluorescent radiation receivers, each oriented to receive radiation from a different one of said irradiated spots, and each providing an electrical output signal when radiation is received, said irradiated spots being adjacent to each other on said surface, said propagators and receivers being spaced from said surface;

coincidence circuit means to which the output signals from said receivers are applied as input signals, an output signal being provided by said coincidence circuit means whenever both input signals are applied simultaneously; and signal-indicating means connected to the output of said coincidence circuit means.

* * * * *